INVENTOR
*Francis L. Struben*

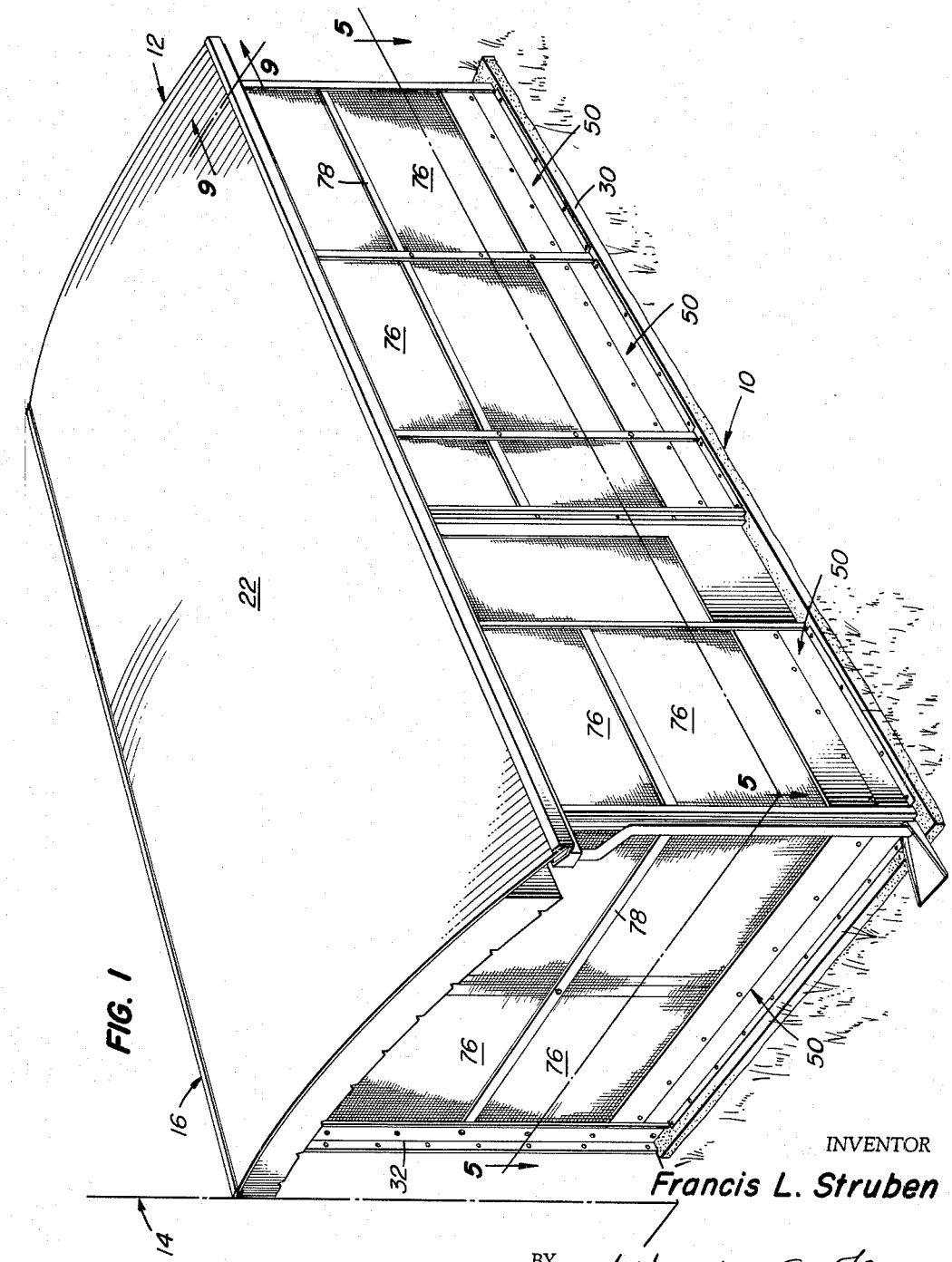
March 22, 1966     F. L. STRUBEN     3,241,273
SCREEN ROOM FOR AWNING
Filed July 6, 1962     5 Sheets-Sheet 1
FIG. I
INVENTOR
Francis L. Struben
BY Walter G. Finch
ATTORNEY March 22, 1966     F. L. STRUBEN     3,241,273
SCREEN ROOM FOR AWNING
Filed July 6, 1962                                                        5 Sheets-Sheet 2
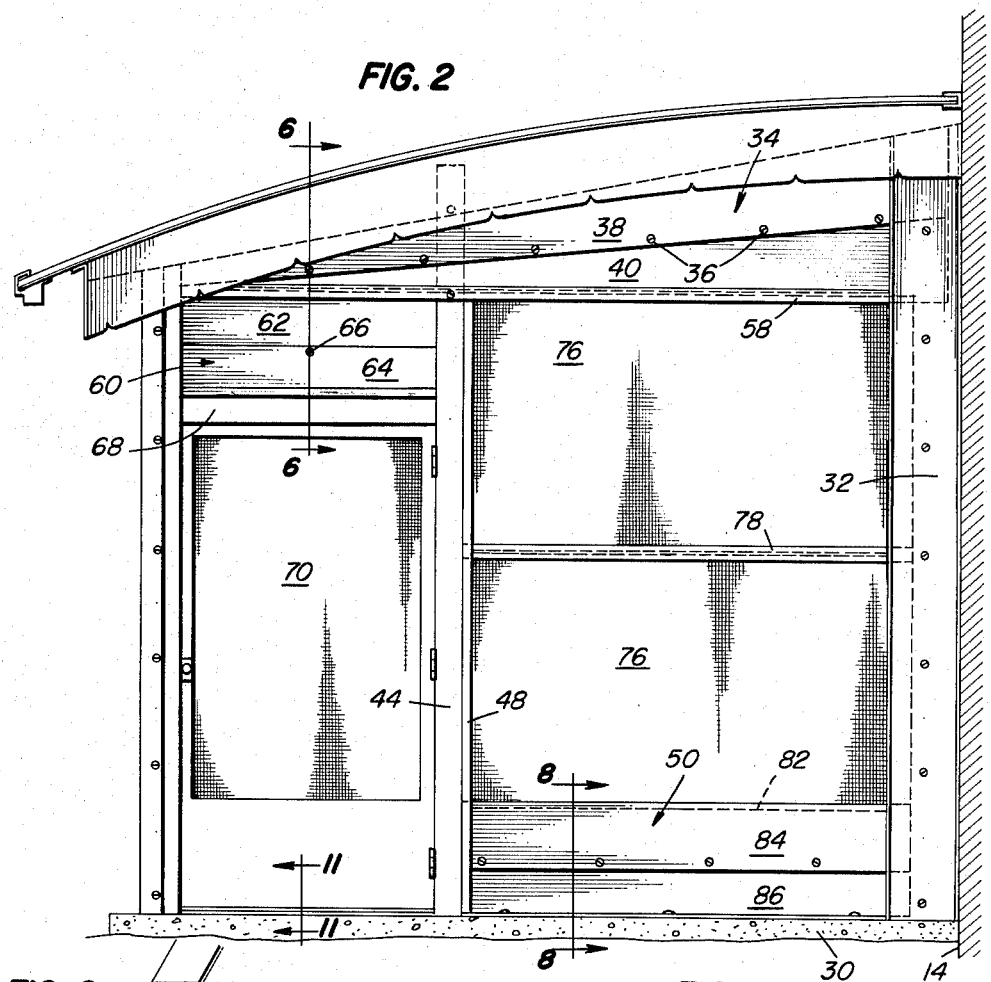
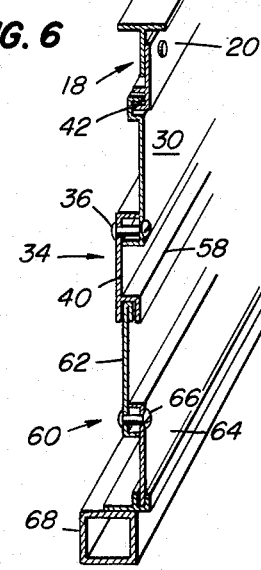
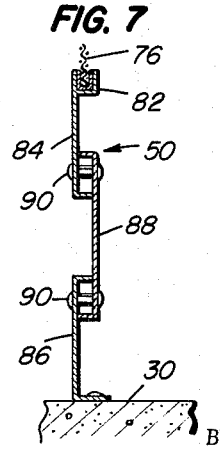
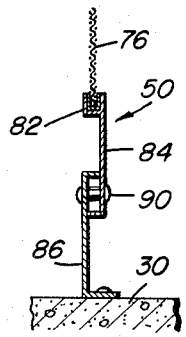
INVENTOR
Francis L. Struben
BY Walter G. Finch
ATTORNEY March 22, 1966  F. L. STRUBEN  3,241,273
SCREEN ROOM FOR AWNING
Filed July 6, 1962  5 Sheets-Sheet 3

BY *Walter G. Finch*
ATTORNEY

March 22, 1966  F. L. STRUBEN  3,241,273
SCREEN ROOM FOR AWNING
Filed July 6, 1962  5 Sheets-Sheet 4
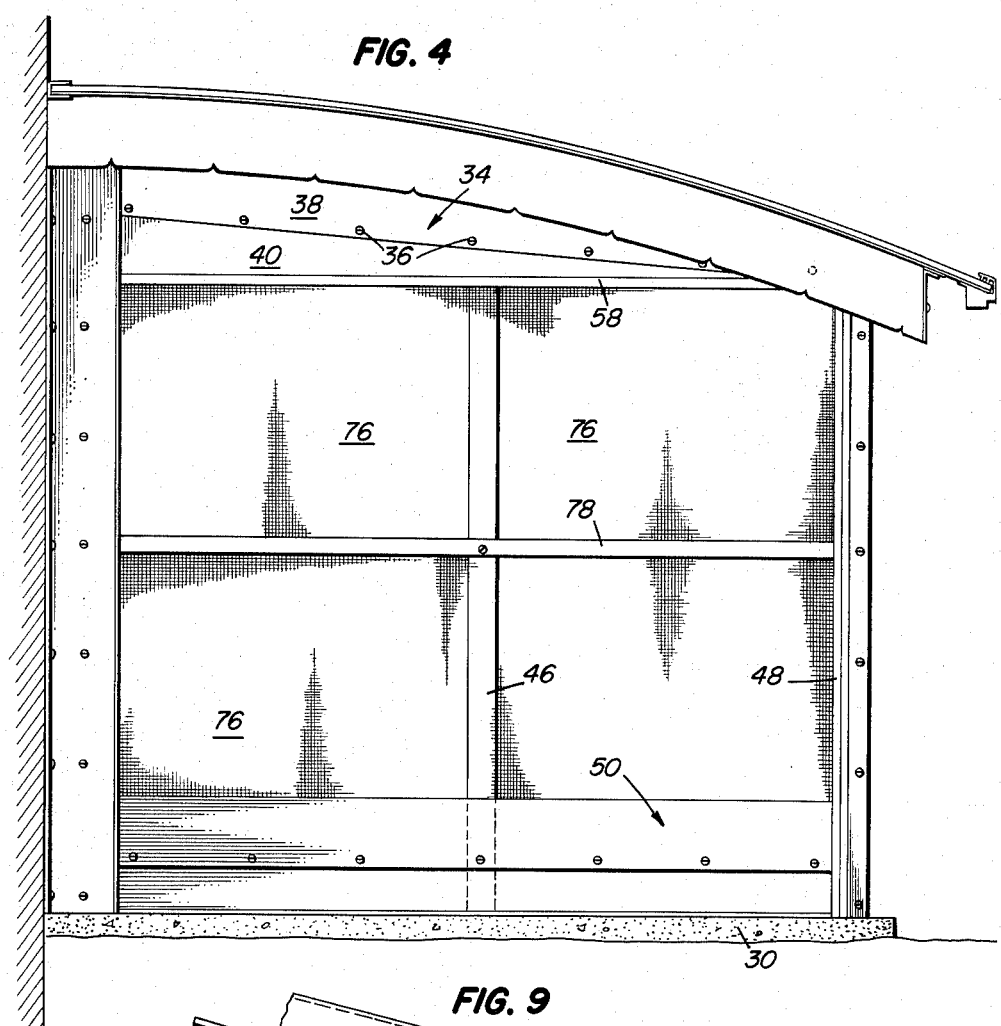
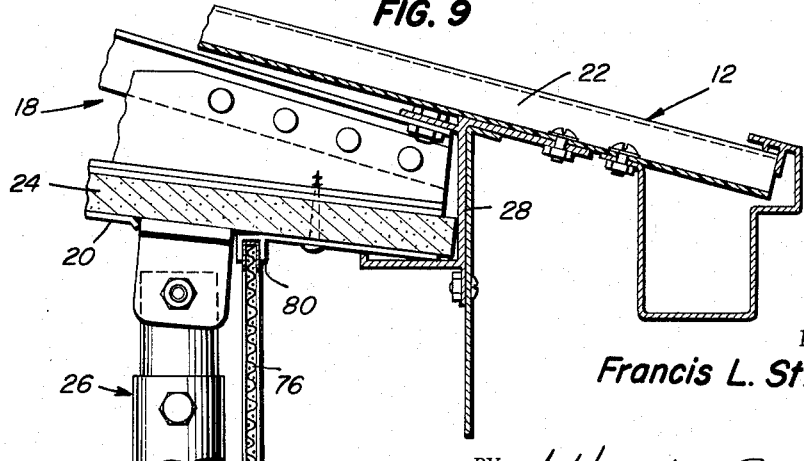
INVENTOR
Francis L. Struben
BY Walter G. Finch
ATTORNEY

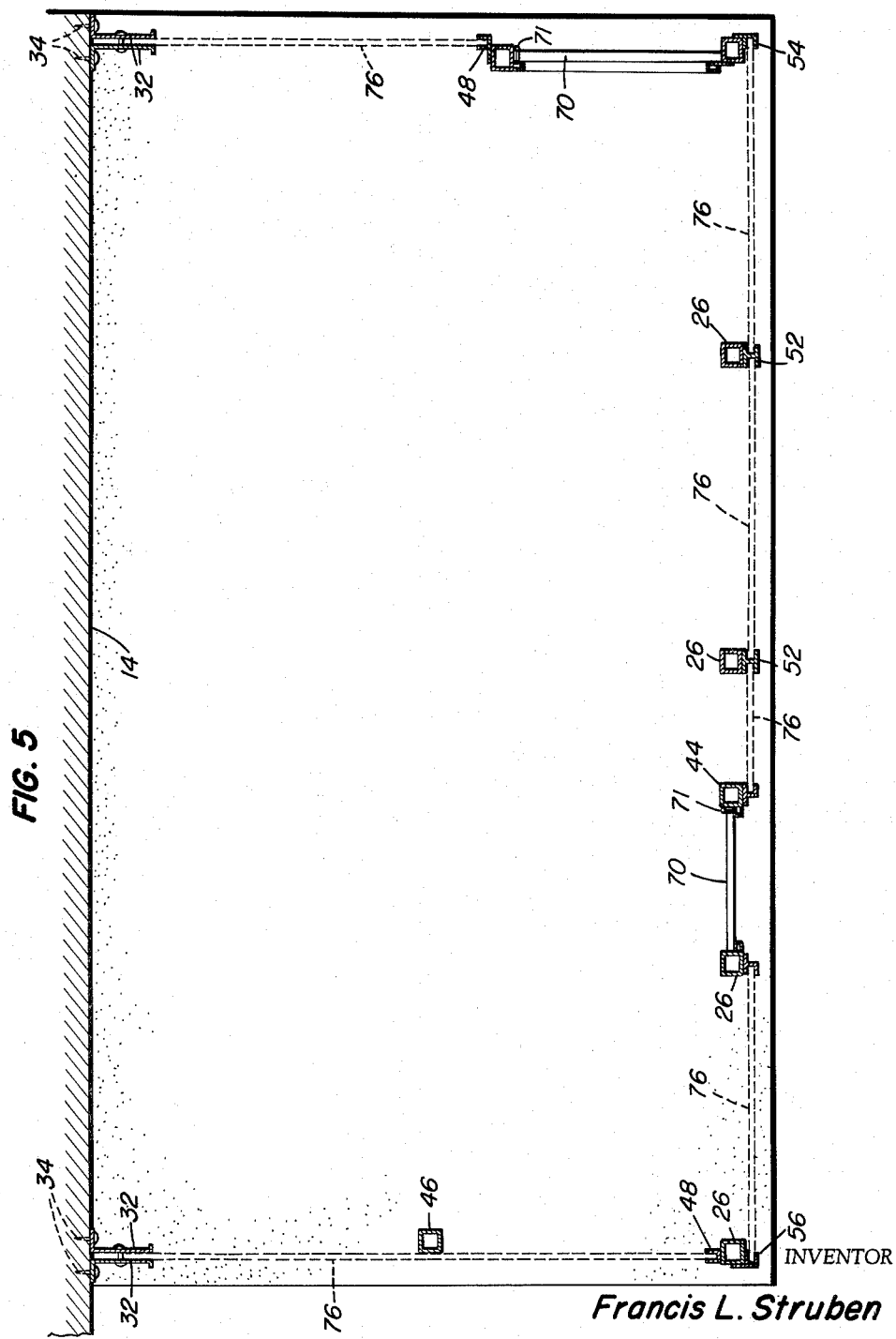

United States Patent Office 3,241,273
Patented Mar. 22, 1966

3,241,273
SCREEN ROOM FOR AWNING
Francis L. Struben, Baltimore, Md., assignor of one-half to Jean C. Struben, Baltimore, Md.
Filed July 6, 1962, Ser. No. 207,956
7 Claims. (Cl. 52—63)

This invention relates generally to awning structures, and more particularly it pertains to a screen room for an awning structure.

An object of this invention is to provide a prefabricated screen enclosure addition to an awning which can be installed with a minimum of tools.

Another object of this invention is to provide mounting hardware for enclosure screening which is adjustable to fit an existing awning structure.

To provide an interlock channel construction in a screen room, is yet another object of this invention.

Other objects and attendant advantages of this invention will become more readily apparent and understood from the following detailed specification and accompanying drawings in which:

FIG. 1 is a general view, in perspective, of a screen room embodying features of this invention shown applied to a companion awning structure of a dwelling;

FIG. 2 is a right side elevation of the screen room of FIG. 1;

FIG. 4 is a left side elevation of the screen room;

FIG. 5 is a sectional plan view taken on the plane of lines 5—5 of FIG. 1;

FIG. 6 is an enlarged detail section view of an adjustable gable and transom taken on line 6—6 of FIG. 2;

FIG. 7 is a vertical section view of an adjustable three piece kick plate;

FIG. 8 is a view similar to FIG. 7 of a two piece adjustable kick plate taken on line 8—8 of FIG. 2;

FIG. 9 is an enlarged fragmentary section view of the front eave of the awning.

Referring now to FIG. 1, there is shown depicted a screen room 10 embodying features of this invention. The screen room 10 is constructed about an awning 12 as a basis.

Awning 12 preferably is of the type shown and described in U.S. Letters Patent No. 2,618,820, issued November 25, 1952, to the present inventor, for "Trailer Awning."

Figure 10:
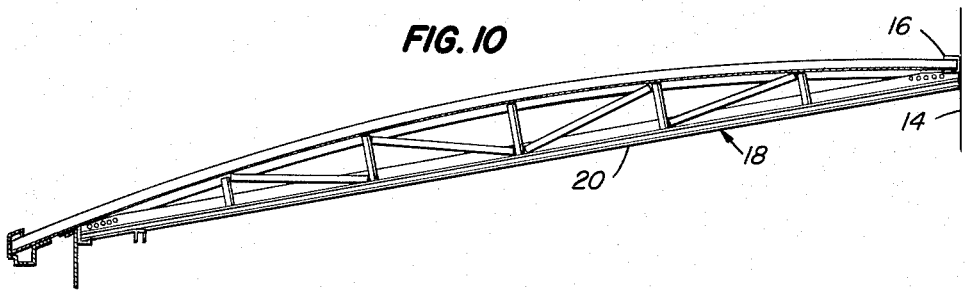
FIG. 10 is a sectional view taken on line 10—10 of FIG. 3.

This awning 12 is designed to be supported on at one side on the wall of dwelling 14 by means of a hanger strip 16. It employs a plurality of spaced trusses 18 secured to a hanger strip 16 fastened to the dwelling wall as shown in FIG. 10. Each truss 20 is constructed of T-shaped and angle pieces including a bottom flange 20.

As best depicted in FIG. 9, the assembly of trusses 18 is used to support roof decking 22 as well as ceiling insulation 24. The latter is conveniently carried by the bottom flanges 20 of the truss 18.

The trusses 18 are held in spaced relationship at the front of the awning 12 by an extrusion 28 which also serves to close the gap between the end of the insulation 24 and the roof decking 22.

Support poles 26, attached to the flanges 20, extend downwardly and are secured at their lower ends to a patio 30 as shown in FIG. 5.

To convert the above described awning 12 to a screened room at each end of the patio 30, a pair of spaced wall flashing strips 32 are vertically attached with screws 34 to the wall of the dwelling 14. Each pair of strips 32 must be located on a perpendicular line drawn from the dwelling 14 to the end support poles 26.

A two-piece adjustable gable 34 is mated by a channel 42 formed thereon to the previously mentioned bottom flange 20 of each of the end trusses 18 and adjusted so the bottom edge is level. For this purpose, sleeve bolts 36 are provided to secure two flanged overlapping component pieces 38 and 40 together as shown in FIGS. 2 and 6.

If a door is to be located on the end of the screen room 10, a door pole 44 is erected from the patio floor 30 to the gable 34 and there secured with suitable fasteners. A stiffener pole 46 is similarly installed if no door is required, as best illustrated in FIGS. 2, 4 and 5. A U-channel 48 is then fastened vertically to the rear face of the door pole 44 and another to the support pole 26 in the screen room corner lacking the door.

Figure 3:
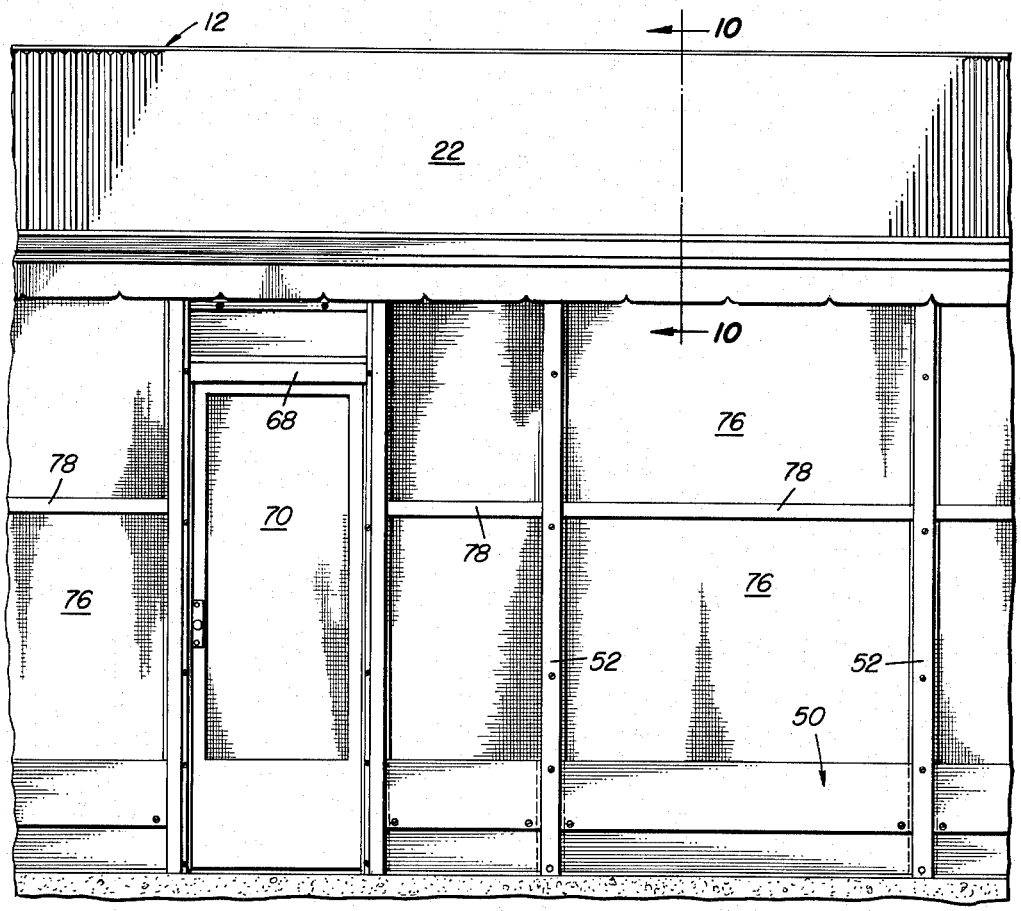
FIG. 3 is a front vertical elevation of a portion of the screen room.

An adjustable kick plate 50 is installed by its bottom flange to the patio floor 30 at each end as shown in FIGS. 2 and 4. The front side of the screen room 10 is also thus treated except that instead of the kick plates 50 being received by U-channels 48 they are received in H-channels 52 as illustrated in FIGS. 1, 3 and 5. F-channels 54 or a lower case h-shaped front channel 56 may also be utilized as best suited to the arrangement.

With reference to FIGS. 2 and 6, it will be noted that the lower piece 40 of the adjustable gable 34 is provided with a channeled lower edge and thus mates with a two piece adjustable transom 60, the flanged overlapping pieces 62 and 64 being fastened together with bolts 66 so that the bottom edge will be level and will fit the screen door 70. The screen door 70 is suitably hinged to the door pole 44.

Framed screens 76 are received in the wall flashing strips 32 and in the vertical channels 48, 52 and 54 as shown in FIGS. 1, 2, 3, 4 and 5 and are secured adjacently together by resting in horizontal H-stiffeners 78.

The upper edges of the top screens 76 are received by the channeled lower edge 58 of the adjustable gables 40 while those of the front top screens are received in a horizontal eave channel 80, shown in FIG. 9 secured to the underside of the trusses 18.

The lower edges of all bottom screens 76 are received in a channel 82 formed in the top piece 84 of the kick plate 50 as shown in FIGS. 2 and 8. Where the two pieces 84 and 86 are of inadequate height, an intermediate piece 88 is used to make up the adjustable kick plate 50 as shown in FIG. 7. In either case, the provision of bolts 90 permits a certain amount of dimensional adjustment and leveling.

Obviously many modifications and variations of the present invention are possible in light of the above teachings. It is, therefore, to be understood that within the scope of the appended claims the invention may be practiced otherwise than as specifically described.

What is claimed is:

1. An adjustable awning type screen room, comprising, awning structure of a lean-to type extending from the wall of a building structure and having a plurality of downwardly sloping spaced roof trusses having flanges, a covering on said roof trusses, a base positioned below said awning structure and spaced there from, and support poles depending from certain of said roof trusses to said base; vertically arranged spaced flashing strips on said wall of said building structure, an adjustable gable including an upper side panel engaged with said flanges of certain of said roof trusses a lower side panel having its upper edge in overlapping relationship with the lower edge of said upper side panel and its lower edge substantially level and channeled, and spaced bolt means fastening together the overlapped edges of said upper side panel and lower side panel, adjustable panel means attached to said base, channel structure secured to said poles, and a frame screen engaged with the lower channeled edge of said lower side panel, said wall flashing strips, and said adjustable panel means and secured by said channel structure to said poles for enclosing said screen room.

2. An adjustable awning type screen room, comprising, awning structure having a plurality of downwardly sloping spaced roof trusses having flanges, a covering on said roof trusses and positioned above a base and spaced therefrom, and support poles depending from certain of said roof trusses to said base; an adjustable gable including an upper side panel engaged with said flanges of certain of said roof trusses and a lower side panel having its upper edge in overlapping relationship with the lower edge of said upper side panel and its lower edge substantially level and channeled, and spaced bolt means fastening together the overlapped edges of said upper side panel and lower side panel, adjustable panel means attached to said base, channel structure secured to said poles, and a framed screen engaged with the channeled edge of said lower side panel, and said adjustable panel means and secured by said channel structure to said poles for enclosing said screen room.

3. In a building construction having a plurality of walls, a sloping roof truss structure having flanges, a covering for said roof truss structure, an adjustable gable means including an upper side panel engaged with said flanges of said roof truss structure and depending downwardly from said truss structure, a lower side panel having its upper edge in overlapping relationship with the lower edge of said upper side panel and its lower edge substantially level and channeled, and spaced bolt means fastening together the overlapping edges of said upper side panel and lower side panel, an adjustable panel means attached to a base and positioned directly below said adjustable gable means and in alignment therewith, said adjustable panel means having its upper edge channeled, and a framed panel engaged with the channeled edges of said adjustable gable means and said adjustable panel means for paneling said building wall construction, whereby non-parallelism between said base and roof truss structure can be compensated for.

4. In a building wall construction, a sloping roof truss having at least one flange, an adjustable gable means including an upper side panel engaged with said flange of said roof truss and depending downwardly from said truss structure, a lower side panel having its upper edge in overlapping relationship with the lower edge of said upper side panel and its lower edge substantially level and channeled, and spaced bolt means fastening together the overlapping edges of said upper side panel and lower side panel, an adjustable panel means attached to a base and positioned directly below said adjustable gable means and in alignment therewith, said adjustable panel means having an upper channeled edge and a framed screen engaged with the channeled edges of said adjustable gable means and said adjustable panel means for screening said building wall construction, whereby non-parallelism between said base and roof truss can be compensated for.

5. The adjustable awning type screen room as recited in claim 2, wherein the upper edge of said adjustable panel means is channeled and said framed screen engages the channeled edge of said adjustable panel means.

6. The adjustable awning type screen room as recited in claim 5 and additionally, a door therefor, an upper framing member for said door, and transom means engaged with the lower channeled edge of said lower side panel and secured to said upper framing member.

7. The adjustable awning type screen room as recited in claim 6, wherein said upper framing member is provided with longitudinal channel means and said transom means is engaged with said longitudinal channel means.

References Cited by the Examiner
UNITED STATES PATENTS

| | | | |
|---|---|---|---|
| 436,668 | 9/1890 | Leonard | 52—70 |
| 1,030,493 | 6/1912 | Sorenson | 160—58 |
| 2,244,649 | 6/1941 | Carpenter et al. | 52—210 |
| 2,595,612 | 5/1952 | Snider et al. | 52—78 |
| 2,618,820 | 11/1952 | Struben et al. | 52—263 |
| 2,745,420 | 5/1956 | Zitomer | 52—93 |
| 2,883,712 | 4/1959 | Shelamer | 52—63 |
| 3,052,291 | 9/1962 | Fellers | 52—207 |

FRANK L. ABBOTT, *Primary Examiner.*

JACOB L. NACKENOFF, *Examiner.*